(12) United States Patent
Hall et al.

(10) Patent No.: US 11,303,584 B2
(45) Date of Patent: Apr. 12, 2022

(54) DUAL FAULT-TOLERANT NETWORK USING GUARDIAN INTERLOCKING

(71) Applicant: Honeywell International Inc., Morris Plains, NJ (US)

(72) Inventors: Brendan Hall, Eden Prairie, MN (US); Kevin Raymond Driscoll, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 196 days.

(21) Appl. No.: 16/600,385

(22) Filed: Oct. 11, 2019

(65) Prior Publication Data

US 2020/0195588 A1 Jun. 18, 2020

Related U.S. Application Data

(60) Provisional application No. 62/779,387, filed on Dec. 13, 2018.

(51) Int. Cl.
*H04L 12/939* (2013.01)
*H04L 49/55* (2022.01)
(Continued)

(52) U.S. Cl.
CPC .......... *H04L 49/557* (2013.01); *H04L 12/422* (2013.01); *H04L 45/24* (2013.01); *H04L 49/555* (2013.01)

(58) Field of Classification Search
CPC ..... H04L 49/557; H04L 12/422; H04L 45/24; H04L 49/555; H04L 2001/0097;
(Continued)

(56) References Cited

U.S. PATENT DOCUMENTS

| 7,372,859 B2 | 5/2008 | Hall et al. |
| 7,502,334 B2 | 3/2009 | Hall et al. |

(Continued)

OTHER PUBLICATIONS

Michael Paulitsch et al., Confrence paper (Ringing out fault tolerance. A new ring network for superior low-cost dependability), Jan. 2005.*

(Continued)

*Primary Examiner* — Kwang B Yao
*Assistant Examiner* — Syed M Bokhari
(74) *Attorney, Agent, or Firm* — Fogg & Powers LLC

(57) ABSTRACT

A network includes a plurality of nodes and a plurality of links communicatively coupling each of the nodes to at least one respective adjacent node via a first communication channel and to another respective adjacent node via a second communication channel. The nodes and links have a braided ring topology. First and second nodes of the plurality of nodes source data, are adjacent nodes, and at least one is a source node. The first node sends a first communication to the second node via a third node that is adjacent the first node and via a fourth node that is adjacent the second node. The second node sends a second communication to the first node via the third node and via the fourth node. At least one of the first and second nodes terminates transmission of the first and second communications when the first and second communications do not match.

19 Claims, 9 Drawing Sheets

(51) Int. Cl.
*H04L 12/42* (2006.01)
*H04L 45/24* (2022.01)

(58) Field of Classification Search
CPC ..... H04L 1/08; H04L 12/40026; H04L 12/42; H04L 12/437; H04L 12/40; G06F 11/1625; G06F 11/1633
USPC ........................................ 370/216, 246, 406
See application file for complete search history.

(56) References Cited

U.S. PATENT DOCUMENTS

| | | | |
|---|---|---|---|
| 7,505,470 B2 | 3/2009 | Hall et al. | |
| 7,606,179 B2 | 10/2009 | Hall et al. | |
| 7,649,835 B2 | 1/2010 | Hall et al. | |
| 7,656,881 B2 | 2/2010 | Hall et al. | |
| 7,668,084 B2 | 2/2010 | Driscoll et al. | |
| 7,729,297 B2 | 6/2010 | Hall et al. | |
| 7,778,159 B2 | 8/2010 | Driscoll et al. | |
| 7,889,683 B2 | 2/2011 | Paulitsch et al. | |
| 7,912,094 B2 | 3/2011 | Hall et al. | |
| 8,122,147 B2 | 2/2012 | Driscoll et al. | |
| 8,130,773 B2 | 3/2012 | Hall et al. | |
| 8,204,037 B2 | 6/2012 | Poledna et al. | |
| 8,265,100 B2 | 9/2012 | Steiner et al. | |
| 8,339,993 B2 | 12/2012 | Paulitsch et al. | |
| 8,498,276 B2 | 7/2013 | Hall et al. | |
| 8,767,767 B2 | 7/2014 | Driscoll et al. | |
| 8,817,597 B2 | 8/2014 | Hall et al. | |
| 8,908,675 B2 | 12/2014 | Hall et al. | |
| 8,917,628 B2 | 12/2014 | Steiner et al. | |
| 8,949,983 B2 | 2/2015 | Hall et al. | |
| 8,976,790 B2 | 3/2015 | Hall et al. | |
| 9,503,521 B2 | 11/2016 | Poledna et al. | |
| 2005/0152379 A1 | 7/2005 | Hall et al. | |
| 2009/0116502 A1* | 5/2009 | Hall | H04L 12/437 370/406 |
| 2010/0023595 A1* | 1/2010 | McMillian | G06F 15/17 709/212 |
| 2013/0219491 A1* | 8/2013 | Hall | H04L 45/22 726/22 |
| 2014/0036735 A1* | 2/2014 | Hall | H04L 45/128 370/276 |

OTHER PUBLICATIONS

European Patent Office, "Extended European Search Report from EP Application No. 19202882.7", from Foreign Counterpart to U.S. Appl. No. 16/600,385, dated May 13, 2020, pp. 1 through 13, Published: EP.

Hall et al., "Ringing Out Fault Tolerance. A New Ring Network For Superior Low-Cost Dependability", Proceedings of the 2005 International Conference on Dependable Systems and Networks (DSN'05), Jun. 28, 2005, pp. 1 through 10, IEEE.

Paulitsch et al., "Insights into Sensitivity of the BRAIN (Braided Ring Availability Integrity Network)-On Platform Robustness in Extended Operation", 37th Annual IEEE/IFIP International Conference on Dependable Systems and Networks (DSN'07), Jun. 1, 2007, pp. 1 through 10, IEEE.

European Patent Office, "Communication pursuant to Article 94(3) EPC from EP Application No. 19202882.7", from Foreign Counterpart to U.S. Appl. No. 16/600,385, dated Apr. 7, 2021, pp. 1 through 4, Published: EP.

\* cited by examiner

DUAL FAULT-TOLERANT NETWORK USING GUARDIAN INTERLOCKING

CROSS-REFERENCE TO RELATED APPLICATIONS

This application claims the benefit of U.S. Provisional Application Ser. No. 62/779,387, filed Dec. 13, 2018, and titled "DUAL FAULT-TOLERANT NETWORK USING GUARDIAN INTERLOCKING," which is hereby incorporated herein by reference.

This application is related to the following U.S. patent applications, all of which are incorporated herein by reference:

U.S. patent application Ser. No. 10/993,931, filed Nov. 19, 2004, and titled "UNSYNCHRONOUS MODE BROTHER'S KEEPER BUS GUARDIAN FOR A RING NETWORKS," issued as U.S. Pat. No. 7,649,835; U.S. patent application Ser. No. 10/994,209, filed Nov. 19, 2004, and titled "CLIQUE AGGREGATION IN TDMA NETWORKS," issued as U.S. Pat. No. 7,505,470; U.S. patent application Ser. No. 10/993,936, filed Nov. 19, 2004, and titled "NEIGHBOR NODE BUS GUARDIAN SCHEME FOR A RING OR MESH NETWORK," issued as U.S. Pat. No. 7,729,297; U.S. patent application Ser. No. 10/993,933, filed Nov. 19, 2004, and titled "HIGH INTEGRITY DATA PROPAGATION IN A BRAIDED RING," issued as U.S. Pat. No. 7,606,179 (referred to herein as "the '179 patent"); U.S. patent application Ser. No. 10/993,932, filed Nov. 19, 2004, and titled "DIRECTIONAL INTEGRITY ENFORCEMENT IN A BI-DIRECTIONAL BRAIDED RING NETWORK," issued as U.S. Pat. No. 7,502,334; U.S. patent application Ser. No. 11/010,249, filed Dec. 10, 2004, and titled "SELF-CHECKING PAIR ON A BRAIDED RING NETWORK," issued as U.S. Pat. No. 7,372,859 (referred to herein as "the '859 patent"); U.S. patent application Ser. No. 11/863,186, filed Sep. 27, 2007, and titled "HIGH-INTEGRITY SELF-TEST IN A NETWORK HAVING A BRAIDED-RING TOPOLOGY," issued as U.S. Pat. No. 7,778,159; U.S. patent application Ser. No. 11/557,886, filed Nov. 8, 2006, and titled "METHOD FOR ACKNOWLEDGEMENT OF MESSAGES IN A STAR NETWORK," issued as U.S. Pat. No. 8,122,147; U.S. patent application Ser. No. 11/610,454, filed Sep. 13, 2006, and titled "SELF-CHECKING PAIR-BASED MASTER/FOLLOWER CLOCK SYNCHRONIZATION," issued as U.S. Pat. No. 7,912,094; U.S. patent application Ser. No. 11/610,450, filed Dec. 13, 2006, and titled "METHOD FOR EXPEDITED START-UP AND CLIQUE AGGREGATION USING SELF-CHECKING NODE PAIRS ON A RING NETWORK," issued as U.S. Pat. No. 7,656,881; U.S. patent application Ser. No. 11/556,577, filed Nov. 3, 2006, and titled "NON-DESTRUCTIVE MEDIA ACCESS RESOLUTION FOR ASYNCHRONOUS TRAFFIC IN A HALF-DUPLEX BRAIDED RING," issued as U.S. Pat. No. 7,889,683; U.S. patent application Ser. No. 11/935,343, filed Nov. 5, 2007, and titled "EFFICIENT TRIPLE MODULAR REDUNDANCY ON A BRAIDED RING," issued as U.S. Pat. No. 8,817,597; U.S. patent application Ser. No. 12/407,710, filed Mar. 19, 2009, and titled "HYBRID TOPOLOGY ETHERNET ARCHITECTURE," issued as U.S. Pat. No. 8,130,773; U.S. patent application Ser. No. 12/437,178, filed May 7, 2009, and titled "DYNAMIC FAULT-TOLERANT CONFIGURATION SUPPORT AND RE-CONFIGURATION OF A BRAIDED RING NETWORK," issued as U.S. Pat. No. 8,339,993; U.S. patent application Ser. No. 13/350,304, filed Jan. 13, 2012, and titled "VIRTUAL PAIRING FOR CONSISTENT DATA BROADCAST," issued as U.S. Pat. No. 8,908,675 (referred to herein as "the '675 patent); U.S. patent application Ser. No. 13/401,390, filed Feb. 21, 2012, and titled "SYSTEM AND METHOD FOR OUT-OF-BAND SIGNALING," issued as U.S. Pat. No. 8,767,767; U.S. patent application Ser. No. 13/566,685, filed Aug. 3, 2012, and titled "DISJOINT DATA PATH ROUTING FOR INTEGRITY AND AVAILABILITY AND AUGMENTATION," issued as U.S. Pat. No. 8,976,790; U.S. patent application Ser. No. 13/401,365, filed Feb. 21, 2012, and titled "SYSTEM AND METHOD FOR INTEGRITY RECONSTITUTION," issued as U.S. Pat. No. 8,949,983; U.S. Provisional Application Ser. No. 62/779,287, filed Dec. 13, 2018, and titled "EFFICIENT SELF-CHECKING REDUNDANCY COMPARISON AND INGRESS-CONGRUENCY DETERMINATION IN A NETWORK"; U.S. application Ser. No. 16/600,390, and titled "EFFICIENT SELF-CHECKING REDUNDANCY COMPARISON IN A NETWORK," filed on even date herewith; and U.S. application Ser. No. 16/600,396, and titled "EFFICIENT INGRESS-CONGRUENCY DETERMINATION IN A NETWORK," filed on even date herewith.

STATEMENT REGARDING FEDERALLY SPONSORED RESEARCH OR DEVELOPMENT

This invention was made with Government support under Government Contract #FA8650-14-D-2410 awarded by AFRL. The Government has certain rights in the invention.

SUMMARY

Systems and methods for a dual fault-tolerant network using guardian interlocking are provided. In one example, a network includes a plurality of nodes; and a plurality of links communicatively coupling each of the plurality of nodes to at least one respective adjacent node of the plurality of nodes via a first communication channel and to another respective adjacent node of the plurality of nodes via a second communication channel, wherein the plurality of nodes and the plurality of links have a braided ring topology; wherein a first node and a second node of the plurality of nodes are configured to source data, wherein the first node and the second node are adjacent nodes, wherein at least one of the first node and the second node is a source node; wherein the first node is configured to send a first communication to the second node via a third node of the plurality of nodes that is adjacent the first node and via a fourth node of the plurality of nodes that is adjacent the second node; wherein the second node is configured to send a second communication to the first node via the third node and via the fourth node; and wherein at least one of the first node and the second node is configured to terminate transmission of the first communication and the second communication when the first communication does not match the second communication.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
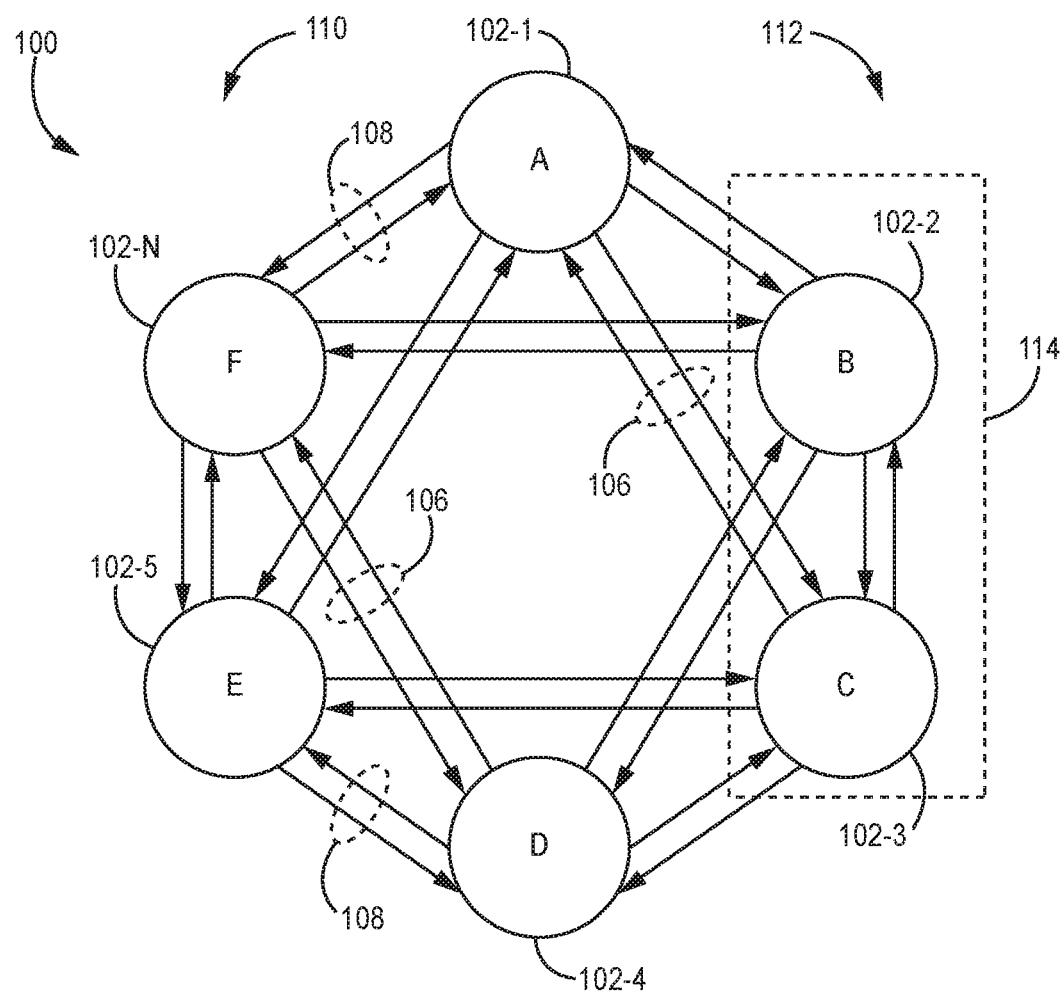
FIG. 1 is a diagram of an example of a network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

There is need for a network that can transfer data among its nodes such that the data is delivered consistently (all receivers get the same data or all reject a message) while tolerating a minimum of one fault having arbitrary errors (babbling, *Byzantine*, inconsistent omission, masquerading, etc.) and one other non-colluding fault. This allows a system to operate with a failure and still meet the stringent requirement of having less than a $10^{\wedge}-9$ probability of another failure in a one-hour exposure (derived from FAA and similar requirements). Consistent data exchange among redundant components is a requirement for almost all fault tolerant digital systems. If consistency is not provided by the network, it must be provided by other mechanisms that are very expensive in software and additional bandwidth. It is desirable that this network would incur the least amount of hardware and software cost, which includes not only procurement cost, but also size, weight, power, and consumption of other system resources.

The example networks described herein improve upon the systems and methods described in the cross-referenced applications. The example networks described herein minimize network costs (size, weight, and power) while achieving a "fly with failure" capability, and eliminating the software complexity, large data exchange bandwidth overhead, and verification costs of typical ad hoc solutions, and other prior solutions. Further, the examples described herein provide the highest protection against cyber intrusion attacks that propagate across intranets.

FIG. 1 is a diagram of an example of a communication network 100. Communication network 100 includes a plurality of nodes 102-1 . . . 102-N. The nodes 102 of FIG. 1 are individually referenced herein as node A through node F. Although six nodes are shown in FIG. 1, it is to be understood that any number of nodes greater than or equal to four can be used in other examples. Each of the nodes 102 is coupled to each of its immediate or adjacent neighbors (also referred to herein using adjectives "adjacent", "direct", or "near" and nouns "neighbor" or "node") via respective near links 108 and to each of its near neighbors' neighbor (also referred to herein as a "skip neighbor" or "skip neighbor node") via respective skip links 106. As shown in FIG. 1, near links 108 and skip links 106 are implemented using full-duplex bi-directional links. However, it is to be understood that, in other examples, near links 108 and skip links 106 are implemented using half-duplex bidirectional links.

Each node 102 has two near neighbor nodes 102, one in the clockwise direction (also referred to here as the "clockwise near neighbor node" or "clockwise near neighbor") and one in the counterclockwise direction (also referred to here as the "counterclockwise near neighbor node" or "counterclockwise near neighbor"). For example, the near neighbor nodes 102 for node A are node B in the clockwise direction and node F in the counterclockwise direction. In addition, each node 102 has two skip neighbor nodes 102, in this example, one in the clockwise direction (also referred to here as the "clockwise skip neighbor node" or "clockwise skip neighbor") and one in the counterclockwise direction (also referred to here as the "counterclockwise skip neighbor node" or "counterclockwise skip neighbor"). For example, the two skip neighbor nodes for node A are node C in the clockwise direction and node E in the counterclockwise direction.

As used herein, when a link 106, 108 is described as being connected 'from' a first node 102 'to' a second node 102, the link 106, 108 provides a communication path for the first node 102 to send data to the second node 102 over the link 106, 108. That is, the direction of communication for that link 106, 108 is from the first node 102 to the second node 102.

For the sake of illustration, the details of nodes 102 are not shown in FIG. 1. However, it is understood that the nodes 102 are implemented using suitable hardware and/or software to implement the functionality described here as being performed by the nodes 102. Each such node 102 also includes a suitable network or other interface for communicatively coupling that node to the links 108 and 106. Examples of suitable node implementations are described in the '179 patent and the '859 patent, though it is to be understood that the nodes 102 can be implemented other ways.

The links 106 and 108 are used to form at least two logical communication channels. In the particular example shown in FIG. 1, the first logical communication channel 110 comprises a communication path around the ring in a first direction (for example, in a counterclockwise direction), and the second logical communication channel 112 comprises a communication path around the ring in a second direction (for example, in a clockwise direction). Each node 102 of the network 100 is communicatively coupled to both channels 110 and 112 to tolerate the desired fault set.

For the respective direction in which data flows in the channels 110 and 112, the channels 110, 112 communicatively directly couple each node 102 to at least two other nodes 102 from which that node 102 receives data (also referred to herein as "receive-from nodes") and to at least two other nodes 102 to which that node 102 transmits data (also referred to here as the "transmit-to nodes"). In some examples, one of the received-from nodes 102 is designated as a "primary" receive-from node 102 and the other receive-from nodes 102 are designated as "secondary" receive-from nodes 102. Generally, when a node "relays" data on channels 110, 112 in the respective direction, the node 102 receives data from one or more receive-from nodes and forwards the received data onto the one or more transmit-to nodes. That is, when a node 102 is relaying data, the node 102 is not the source of the data that the node 102 is forwarding onto other nodes. In some examples, when a node 102 "relays" data, that node 102 receives data from the primary receive-from node 102 and forwards the received data onto each of the transmit-to nodes designated for that node 102. Data received by a node from the secondary receive-from nodes 102 is used for the various comparison operations described below and/or is relayed in the event that suitable data is not received from the primary receive-from node. When a given node 102 "transmits" data (that is, when the given node 102 is the source of data communicated on the network 100) along channels 110, 112, that node 102 transmits the data to each of the transmit-to nodes 102 designated for that node 102 for the respective channel 110, 112.

In the particular example shown in FIG. 1, the nodes 102 are arranged in a ring having a "braided ring" topology in which the nodes 102 communicate with one another over multiple communication channels 110, 112 as described above. In the particular example shown in FIG. 1, six nodes 102 communicate with one another over two replicated communication channels 110, 112. In other examples, a different number and/or type of nodes 102 and/or channels 110, 112 and/or a different network topology are used. For example, a mesh network topology can be used in other examples.

In the particular example shown in FIG. 1, for channel 110, the receive-from nodes for each node 102 are that node's clockwise near neighbor and clockwise skip neighbor and the transmit-to nodes for each node 102 are that node's counterclockwise near neighbor and counterclockwise skip neighbor. In the examples described herein, when transmissions are relayed from node to node within channel 110, the primary receive-from node is each node's clockwise skip neighbor (though in other examples, the primary receive-from node is the node's clockwise near neighbor). In the particular example shown in FIG. 1, for channel 112, when transmissions are relayed from node to node within channel 112, the receive-from nodes for each node 102 are that node's counterclockwise near neighbor and counterclockwise skip neighbor and the transmit-to nodes for each node 102 are that node's clockwise near neighbor and clockwise skip neighbor. In the examples described herein, when transmissions are relayed from node to node within channel 112, the primary receive-from node is each node's counterclockwise skip neighbor.

In the particular example shown in FIG. 1, the network 100 is implemented as a peer-to-peer network in which each transmission is intended to be received by each node 102 of the network 100. In other examples, each transmission is intended for a particular destination node (a.k.a., unicast) or a proper subset of nodes (a.k.a., multicast). Nodes not intended for transmission reception may be involved in relaying a transmission from a transmission source to intended receivers. Moreover, in the examples described here, data is communicated in the network 100 in the form of frames of data though it is to be understood that, in other examples, other units of data are communicated over the network 100.

Figure 2:
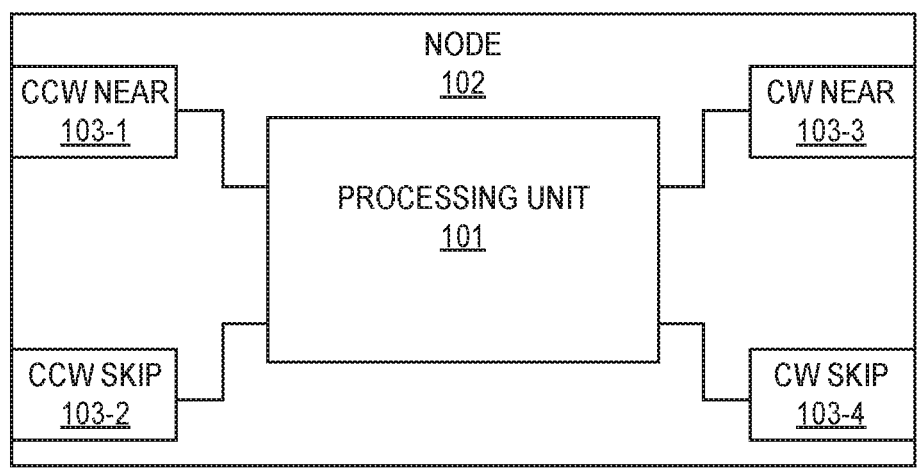
FIG. 2 is a block diagram of an example of a communication node.

FIG. 2 is a block diagram of an exemplary node 102 that can be implemented in a communication network such as network 100 above. It is to be understood that in some examples, the links coupling the node 102 to other nodes are implemented using full-duplex bi-directional links and, in other examples, the links are implemented using half-duplex bi-directional links. In addition, as used herein, the term "communicating data" refers to either transmitting data or relaying data, whereas "transmitting" refers to outputting data that is sourced at the node 102 and "relaying" refers to outputting data that is sourced from another node and received at node 102.

Node 102 includes a plurality of ports 103. In particular, node 102 includes a counterclockwise near port 103-1 configured to receive data on the first channel 112 in a first direction from a first near neighbor node adjacent to the node 102, where the first near neighbor node is positioned counterclockwise compared to the node 102 in the braided ring communication network 100. The counterclockwise near port 103-1 also is configured to send data to the first near neighbor node on the second channel 110 in a second direction via the counterclockwise near link.

Node 102 also includes a counterclockwise skip port 103-2 configured to receive data on the first channel 112 in the first direction from a first skip neighbor node, where the first skip neighbor node is positioned counterclockwise compared to the node 102 in the braided ring communication network 100. The counterclockwise skip port 103-2 also is configured to send data to the first skip neighbor node on the second channel 110 in the second direction via the counterclockwise skip link.

Node 102 also includes clockwise near port 103-3 configured to receive data on the second channel 110 in the second direction from a second near neighbor node adjacent to the node 102, where the second near neighbor node is positioned clockwise compared to the node 102 in the braided ring communication network 100. The clockwise near port 103-3 also is configured to send data to the second near neighbor node on the first channel 112 in the first direction via the clockwise near link.

Node 102 also includes clockwise skip port 103-4 configured to receive data on the second channel 110 in the second direction from a second skip neighbor node, where the second skip neighbor node is positioned clockwise compared to the node 102 in the braided ring communication network 100. The clockwise skip port 103-4 also is configured to send data to the second skip neighbor node on the first channel 112 in the first direction via the clockwise skip link.

In addition, node 102 includes a processing unit 101. Processing unit 101 is configurable to communicate with one of the first neighbor node or the second neighbor node to form a self-checking pair, which can be a true pair (for example, two source nodes transmitting identical data) or a virtual pair (for example, a single source node and another node transmitting identical data sourced from the single source node). When the node 102 sources data to be transmitted to other nodes of the network, the processing unit 101 determines when to form a self-checking pair with one of the first near neighbor node or the second near neighbor node. In some examples, the processing unit 101 analyzes a transmission schedule to determine when to form a self-checking pair and with which near neighbor to form the pair. In some such examples, the processing unit 101 directs the transmission of the data being sourced by the node 102 to the other near neighbor node forming the virtual self-checking pair prior to, or concurrently with, a scheduled timeslot in which the node 102 is to transmit the data to the other nodes of the network.

In addition, the node 102 is configured to increment a hop count value for data sourced from another node and received over one of the ports 103 at the node 102. The hop count is attached to its data as it traverses the ring. In some examples, the hop count value is set and/or incremented in the hardware components at the physical layer of the node 102 prior to forwarding the data. In other examples, the hop count value is incremented in the application layer by the processing unit 101 running a higher-level application.

In some examples, the term "increments" refers to increasing the hop count value (for example, incrementing by a positive value). In such examples, the hop count value is initially set to zero by the node which sources the data and each node 102 increases the received hop count value. Furthermore, the increment value can be different for data received over a near link than for data received over a skip link. In particular, if the skip link bypasses one or more nodes, the function used to increment the hop count value received over the skip link is configured to compensate for the nodes that are bypassed. In some examples, the hop count value is increased by '1' if received over a near link and is increased by '2' if received over a skip link that bypasses a single node. In other words, the function adds '1' to the hop count value received over the near link and adds 'M+1' to the hop count value received over the skip link, where M is equal to the number of nodes bypassed by the skip link. In such examples, the hop count after incrementing in node 102 indicates the number of nodes (including itself) in a particular channel between the source of the data and this node 102, regardless of the path of near and skip links the data transmission has traversed.

In addition, the node 102 is configured to increment the hop count value received over the first channel 110 in the first direction and to increment the hop count value received over the second channel 112 in the second direction. The node 102 also is configured to prevent the hop count value from being a negative value and to prevent the increment from causing a "roll-over." In particular, the hop count is held in a finite field that has no specific representation for a negative number. Thus, the effect of trying to represent a negative number will result in a roll-over, e.g., if the increment tries to add one to hop count that is already the largest value. In some examples, node 102 prevents negative hop counts by refusing to relay any data where the hop count increment resulted in a roll-over. In other examples, node 102 prevents negative hop counts by setting an "invalid" flag for data that have an associated hop count resulting from a roll-over.

By preventing a negative value in the hop count, node 102 helps prevent a node that sources data from masquerading as a different node. In particular, in order to accept the data for processing, in some examples, the node 102 combines the hop count value received over the first channel 112 and the hop count value received over the second channel 110 and compares the combined hop count value with a predetermined value. In particular, for a paired source where each half of the pair transmits data with an initial hop count of zero, if the combined hop count from the two channels does not indicate a total number of hops for the two channels as N−1, where N is the total number of nodes in the network, the node 102 determines that a masquerade or similar fault has occurred. For example, since the data is transported around the network in both the first and second directions, the hop count value is used to identify the node that sourced the data. The source node cannot successfully act as a different node since the hop count values will not be proper for predetermined value since a negative value is not permitted. The prevention of negative values means that any attempt at masquerading will result in the total hops in the two channels being larger than the N−1 for the masquerade-free paired-source case. In some examples, non-critical data can be sent from non-paired (simplex) sources. In these examples, the total number of hops for simplex sources would be N. The hop count mechanism still prevents masquerading for simplex sources.

While the operation of the hop count described above refers to increasing the hop count, it should be understood that other examples are also possible. For example, the node 102 can be configured to decrease the received hop count value (for example, incrementing by a negative value) rather than increase the hop count value as discussed above. In such examples, the hop count value would be initially set to N, where N is the total number of nodes in the network, by the node which sources the data. The decreasing hop count helps prevent a node that sources data from masquerading as a different node similarly to the increasing hop count example. In particular, in order to accept the data for processing, in some examples, the node 102 combines the hop count value received over the first channel 112 and the hop count value received over the second channel 110 and compares the combined hop count value with a predetermined value. In particular, for a paired source where each half of the pair transmits data with an initial hop count of N, if the hop count from the two channels do not indicate a total number of hops for the two channels as 1, the node 102 determines that a masquerade or similar fault has occurred. In other examples, decrements of other number representations (for example, Gray code, LFSR sequence, or the like) can be used to count the hops.

In some examples, the increment value is the same for both channels (for example, both channels used a positive value or a negative value). In other examples, the increment value for the first channel is different than the increment value for the second channel (one positive and one negative). In either scenario, it should be understood that the hop counts received on separate channels can be compared with a predetermined value in such a manner that enables the node 102 to determine the total number of nodes in the communication network and whether a masquerade or similar fault has occurred.

In some examples, the sequence of messages, the messages' sizes, the periods of time (timeslots) when each message may be transmitted, and the roles of transmitter, receiver, and relayer for each message is defined in a schedule table for the communication network 100 and each node 102 of the communication network 100 includes a copy of the schedule table. Each node is configured to synchronously step through its copy of the table to know which node 102 has which role for each message. At the beginning of each timeslot, each node 102 determines it role from the schedule table and performs the particular actions for that particular type of node role.

In some examples, two of the nodes 102 are configured to form a real self-checking pair (also referred to herein as a "true pair") with each other. In the example shown in FIG. 1, node B forms a true pair 114 with node C. Nodes C and B then act as a true pair to output the data to the other nodes of the network 100. Operation of the nodes of a true pair and its guardian nodes is discussed below with respect to FIGS. 3A-3D. Operation of a relay node in the communication network having the true pair or virtual pair and the guardian nodes is discussed below with respect to FIGS. 5A-5B. It should be understood that the designation of the particular nodes for the true pair, the guardian nodes, and the relay nodes is for ease of description and that in practice the nodes will likely have different roles for different timeslots depending on the circumstances.

True Pair Scenario

FIGS. 3A-3D are diagrams depicting exemplary propagation of data in an example of a communication system.

Each member of the real self-checking pair, in this example nodes B and C, is configured to operate in a similar manner. The members of the true pair are adjacent to each other (connected via a near link) and are referred to generally as the clockwise member and the counterclockwise member, where the clockwise member is positioned clockwise from the other member of the true pair and the counterclockwise member is positioned counterclockwise from the other member of the true pair. In this example, node B is the counterclockwise member and node C is the clockwise member. For ease of description, the operation of the communication network will be described when nodes B and C are the members of the true pair. However, it should be understood that the concepts described herein are generally applicable to other combinations for a true pair.

The communication network 100 can communicate using two distinct data propagation techniques: cut-through flooding message propagation and store-and-forward-message propagation. The operation of the communication network 100 varies depending on the particular data propagation technique used, so the cut-through flooding message propagation will be described first, and the store-and-forward message propagation will be described after.

As discussed herein, cut-through flooding message propagation involves a continuous data stream being transmitted between nodes. In some examples, the communication network 100 uses a synchronous Media Access Control (MAC) in order to enable the cut-through flooding message propagation and this greatly simplifies the hardware by eliminating any message buffering in the message propagation path.

At the beginning of a timeslot where the nodes B and C are configured to operate as a true pair, both node B and node C will kill or otherwise terminate any data stream currently being relayed or guarded by node B or node C. This operation enables the true pair to prevent a babbling node from interfering with this timeslot's transmission of data from the true pair through the guardian nodes.

The nodes of the true pair proceed with waiting a particular delay time, which is an implementation dependent delay from the start of the timeslot to the start of the transmission time. Waiting for the particular delay time ensures that the termination of current data streams has completed. In some examples, there is also a delay in the timeslot from the beginning of the timeslot to the start of the transmission time to allow for clock skew between the transmitter and the receivers.

When the delay time expires, each node of the true pair proceeds with transmitting data streams to the other node of the true pair via the guardian nodes. In particular, each node of the true pair transmits an identical data stream to each of the guardians, and the guardians then relay the data stream to the other member of the true pair. Each member of the true pair continuously compares the data stream it initially sent to the data stream received from the other member via the guardian nodes. If the data streams do not match, then all transmission for the communication network is terminated for that timeslot using truncation as discussed below.

In this example, nodes A and D are the guardian nodes. In this example, node B transmits a data stream to node A via a near link and to node D via a skip link, as shown by the arrows leaving node B in FIG. 3A. Similarly, node C transmits a data stream to node A via a skip link and to node D via a near link, as shown by the arrows leaving node C in FIG. 3B. The data streams transmitted from nodes B and C have a hop count of zero, which indicates that nodes B and C are the source. These data transmissions from nodes B and C take place simultaneously.

Figure 3B:
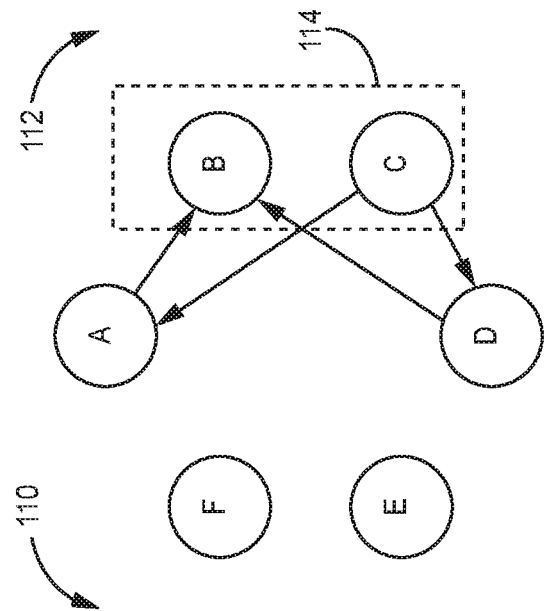
FIGS. 3A-3D are diagrams depicting exemplary propagation of a message in an example of a network.
Figure 3A:
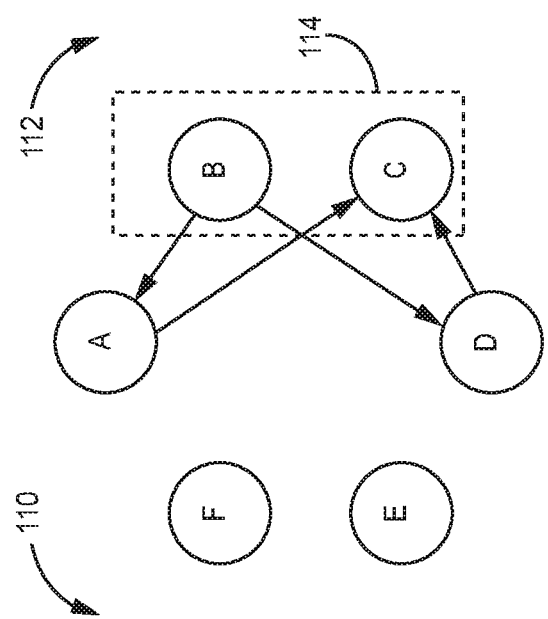

The guardian nodes are configured to relay the data stream received from one of the true pair nodes to the other true pair node. The guardian nodes are generally referred to as the clockwise guardian node and the counterclockwise guardian node, in a manner similar to the nomenclature for the true pair. The two guardian nodes operate similarly, but in different directions. In this example, Node A is configured to relay the data stream received from node C via the skip link to node B via a near link, as shown in FIG. 3B. Node A is also configured to relay the data stream received from node B via the near link to node C via a skip link, as shown in FIG. 3A. Similarly, node D is configured to relay the data stream received from node C via the near link to node B via a skip link, as shown in FIG. 3B. Node D is also configured to relay the data stream received from node B via the skip link to node C via the near link, as shown in FIG. 3A. It is noted that node A need not increment the hop count for the data stream relayed to node B or for the data stream relayed to node C. Similarly, node D need not increment the hop count for the data stream relayed to node B or for the data stream relayed to node C as shown in FIGS. 3A-3B. The true pair and the guardian nodes are effectively an "atomic source" where the hop count is not needed internally and the hop count on all links from these nodes to the rest of the ring are such that the all hop counts represent a hop count of zero leaving both nodes in the true pair. The atomic (meaning indivisible) characteristic also means that if any of the four nodes (two true pair and two guardians) don't agree that the two true pair nodes are sending identical data on all their links, all four nodes work at blocking the remainder of the transmission, described in the following paragraphs.

Data streams that are transmitted outside these four nodes would have their hop counts incremented. In this regard, the counterclockwise guardian node, node A in this example, is configured to relay the data stream received from node B via a near link to node F via a near link, as shown in FIG. 3C. Node A would increment by 1 the hop count it received from node B and node F would increment by 1 the hop count it received from node A. Thus, in this scenario, node F would see a cumulative hop count of 2 in channel 110. Node A is also configured to relay the data stream received from node B via a near link to node E via a skip link, as shown in FIG. 3C. Node A would increment by 1 the hop count it got from node B and node E would increment by 2 the hop count it got from node A. Thus, in this scenario, node E would see a cumulative hop count of 3 in channel 110.

Figure 3D:
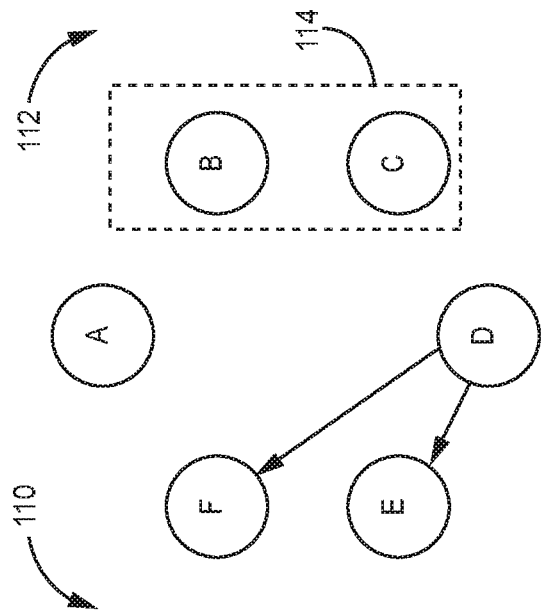
Figure 3C:
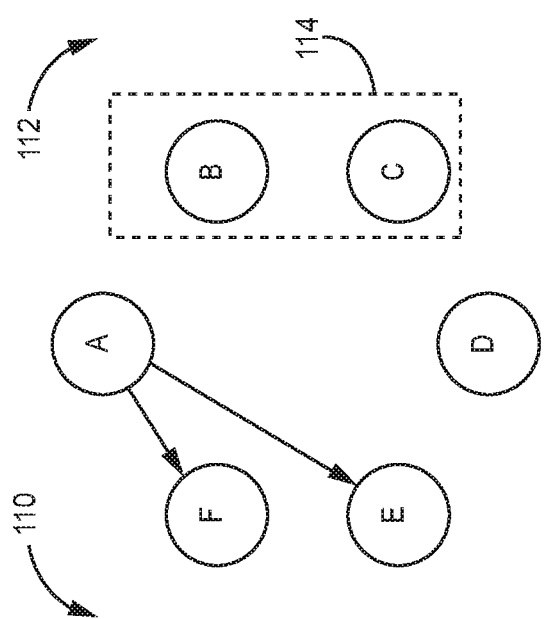

Similarly, the clockwise guardian node, node D in this example is configured to relay the data stream received from node C via a near link to node E via a near link, as shown in FIG. 3D. Node D would increment by 1 the hop count it received from node C and node E would increment by 1 the hop count it received from node D. Thus, in this scenario, node E would see a cumulative hop count of 2 in channel 112. Node D is also configured to relay the data stream received from node C via a near link to node F via a skip link, as shown in FIG. 3D. Node D would increment by 1 the hop count it got from node C and node F would increment by 2 the hop count it got from node D. Thus, in this scenario, node F would see a cumulative hop count of 3 in channel 112.

In this scenario, node E would see a hop count of 3 in channel 110 and a hop count of 2 in channel 112; and, node F would see a hop count of 2 in channel 110 and a hop count of 3 in channel 112. By combining the hop counts for channels 110 and 112, nodes E and F each would see a sum of 5, which is the correct N−1 for this 6-node scenario. In some examples, the guardian nodes are also configured to determine whether the hop count is greater than or equal to a threshold and terminate transmission if this condition is met. In some examples, the threshold is 128, which is the threshold to avoid a rollover or overflow scenario for a 7-bit hop count field.

Each node of the true pair compares the data stream that it initially sent to the guardian nodes to the data stream it receives from the guardian nodes. If the data stream received from the guardian nodes does not match the data stream the true pair node sent, then all transmission for the communication system is terminated for that timeslot. For example, if the data stream that node B receives from node C via node A or the data stream that node B receives from node C via node D does not match the initial data stream sent by node B, then node B will terminate transmission for that timeslot. Similarly, if the data stream that node C receives from node B via node A or the data stream that node C receives from node B via node D does not match the initial data stream sent by node C, then node C will terminate transmission for that timeslot.

When cut-through flooding message propagation is used, the delay through each node is minimal, comprising only a few bits (or even a fraction of a bit on low bit rate networks) of delay for each node. Thus, the delay for a data stream to circumnavigate the ring is negligible with respect to the time it takes to transfer all the bits in a data stream. It should be noted that, when using cut-through flooding message propagation, the communication among the nodes of the true pair, the guardian nodes, and the other nodes of the communication network 100 can occur simultaneously as well as the comparison by the nodes of the true pair. In particular, the nodes of the true pair can compare the received data from the guardians on the fly on a bit-by-bit basis.

Figure 4:
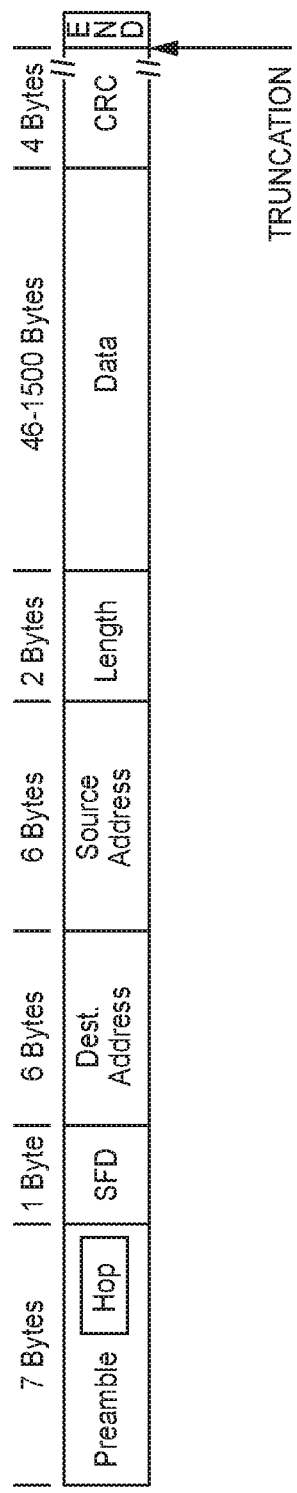
FIG. 4 is a diagram depicting exemplary propagation of a message in an example of a network.

In the examples using cut-through flooding message propagation, the true pair nodes are configured to terminate any faulty transmission for a timeslot by truncating a faulty data stream so it is incomplete, which will signal to the other nodes of the communication network to stop transmission due to a fault. A receiver is able to determine that a data stream is incomplete if it ends in a fraction of a byte (Ethernet and many other network protocols require whole bytes) or if the "END" is missing. The END pattern is different for each Ethernet speed and for other protocols. FIG. 4 shows the format of an Ethernet frame (data stream) and the point where the truncation that indicates a faulty frame could end a data stream prematurely, by cutting off some or all the CRC bits and the END pattern. Many (most) other protocols end their data streams with a CRC, checksum, or an END pattern of some type that can be handled similarly as shown in FIG. 4. For such protocols, a benefit of this truncation is that it transforms a data stream with erroneous data that could not otherwise be detected by standard network devices into an error that is detectable by standard network devices.

There is a delay from when the last bit of data is checked until the truncation can be performed. This delay is the propagation delay from a pair member, through a guardian node, and back to the other pair member, plus the time to do the comparison and initiate the truncation, plus any time skew (due to synchronization not being perfect) between the pair members. In some examples, a data stream includes a "tail" or end portion which is some transmission signaling between the last bit of the data stream checked and the end of the data stream to accommodate this delay. The time to transmit this tail will be longer than the delay described here. For most protocols, data streams end with a CRC, checksum, or other error detection field that follows the last bit of data and data streams are sufficiently long that this ending can act as the tail. In the Ethernet example of FIG. 4, the CRC contains 4 bytes of 8 bits each. Thus, there are 32 bits between the last data bit of the frame and the END pattern. These bits plus the time it takes to transmit the END pattern form a tail that allows enough time to accommodate truncation delay.

For the rare protocols without a distinctive end of data stream or don't already have some transmission time that can act as a tail, the length of each data stream must be known, either agreed between sender and receivers a priori or by incorporating length in the header of the data stream and a tail must be added after the data stream's data that consists of one or more sacrificial (don't care) bits, which have a transmission time longer the delay described above and have a size that is included in the data stream's nominal length. An incomplete data stream is signaled by a data stream shorter than its nominal length.

Figure 5B:
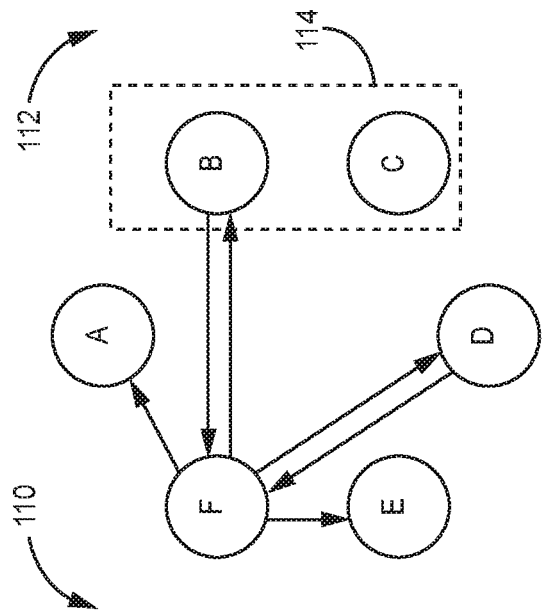
FIGS. 5A-5B are diagrams depicting exemplary propagation of messages by relay nodes in an example of a network.
Figure 5A:
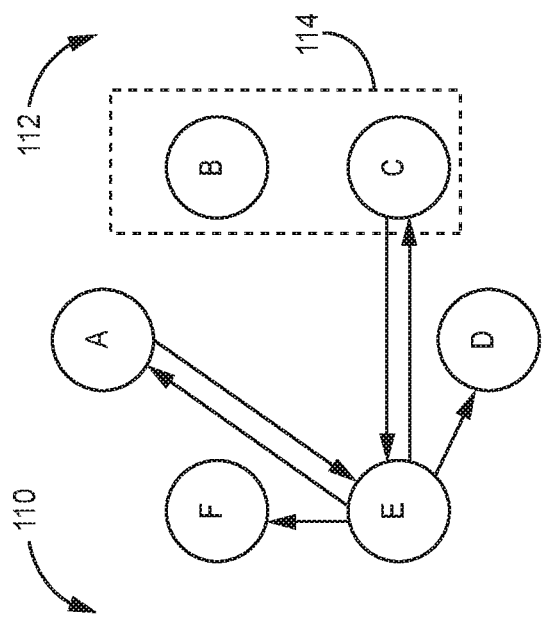

FIGS. 5A-5B are diagrams depicting exemplary propagation of data streams by a relay node of a communication system. The relay nodes prefer to receive inputs via a skip link, and relay the data stream via a near link and a skip link. Similar to the description order for the true pair and the guardian nodes, the operation of the relay node will be described first with respect to the cut-through flooding message propagation technique.

In the example shown in FIG. 5A, relay node E operation is depicted. In this example, Node E is configured to relay the data stream received from node C via the skip link to node F via a near link. Node E is also configured to relay the data stream received from node C via the skip link to node A via a skip link. In the other direction, node E is configured to relay the data stream received from node A via a skip link to node D via a near link. Node E is also configured to relay the data stream received from node A via the skip link to node C via a skip link. In each of the scenarios, node E is configured to increment the hop count by 2 since the data streams being relayed are received over a skip link.

In the example shown in FIG. 5B, relay node F operation is depicted, which is similar to the operation of node E. In this example, Node F is configured to relay the data stream received from node D via the skip link to node A via a near link. Node F is also configured to relay the data stream received from node D via the skip link to node B via a skip link. In the other direction, node F is configured to relay the data stream received from node B via a skip link to node E via a near link. Node F is also configured to relay the data stream received from node B via the skip link to node D via a skip link. In each of the scenarios, node F is configured to increment the hop count by 2 since the data streams being relayed are received over a skip link.

When implementing the true pair and guardian nodes as discussed above, the nodes in the communication network use a consistent set of criteria for accepting a data stream received by the node. First, it is required that a data stream must be completely received (for example, not truncated as discussed above) in order for it to be accepted. If the protocol includes a tail, the tail must be complete. If a respective node receives a complete data stream, the respective node of the communication network accepts the entire data stream if any six of the following conditions are true:

First Condition: (1) If a data stream is received via the counterclockwise near port 103-1 and the counterclockwise skip port 103-2; and (2) the data streams are identical.

Second Condition: (1) If a data stream is received via the clockwise near port 103-3 and the clockwise skip port 103-4; and (2) the data streams are identical.

Third Condition: (1) If a data stream is received via the counterclockwise near port 103-1 and the clockwise near port 103-3; (2) the data streams are identical except for hop count; and (3) the sum of the hop counts equals the total number of nodes in the braided ring minus one.

Fourth Condition: (1) If a data stream is received via the counterclockwise near port 103-1 and the clockwise skip port 103-4; (2) the data streams are identical except for hop count; and (3) the sum of the hop counts equals the total number of nodes in the braided ring minus one.

Fifth Condition: (1) If a data stream is received via the counterclockwise skip port 103-2 and the clockwise near port 103-3; (2) the data streams are identical except for hop count; and (3) the sum of the hop counts equals the total number of nodes in the braided ring minus one.

Sixth Condition: (1) If a data stream is received via the counterclockwise skip port 103-2 and the clockwise skip port 103-4; (2) the data streams are identical except for hop count; and (3) the sum of the hop counts equals the total number of nodes in the braided ring minus one.

In some examples, the communication network 100 uses store-and-forward message propagation, which includes message buffering in the message propagation path. In such examples, the delay through each node is longer compared to the cut-through propagation since the full message must be received before it can be forwarded at each relaying node. In the examples where store-and-forward message propagation is used, the message is time stamped when it is received by each respective node and a message is time stamped when it is sent by the respective node. In addition, the residence time at the node (difference between time stamps) is added to the outgoing message to accurately capture the total delay for the particular path. In some examples, the communication system utilizes precise synchronization techniques as described in the IEEE 1588 standard, which is incorporated herein by reference. By keeping track of the delay in this manner, a true pair can ensure that the correct data is compared for its messages sent to itself via its guardians, as described below. Similarly, each other node in the ring can compare data received on its four ports to ensure that that the correct data is compared when checking that no errors have entered the data while in transit.

At the beginning of a timeslot where the nodes B and C are configured to operate as a true pair, both node B and node C will kill or otherwise terminate any messages currently being relayed or guarded by node B or node C. This operation enables the true pair to prevent a babbling node from interfering with this timeslot's transmission of data from the true pair through the guardian nodes.

The nodes of the true pair proceed with waiting a particular delay time, which is an implementation dependent delay from the start of the timeslot to the start of the transmission time. Waiting for the particular delay time ensures that the termination of current messages has completed. In some examples, there is also a delay in the timeslot from the beginning of the timeslot to the start of the transmission time to allow for clock skew between the transmitter and the receivers.

When the delay time expires, each node of the true pair proceeds with transmitting messages to the other node of the true pair via the guardian nodes. In particular, each node of the true pair transmits an identical message to each of the guardians, and the guardians then relay the message to the other member of the true pair. Each member of the true pair compares the message it initially sent to the message received from the other member via the guardian nodes. If the messages do not match, then all transmission for the communication network is terminated for that timeslot using self-affirmation message truncation as discussed below.

In this example, nodes A and D are the guardian nodes. In this example, node B transmits a message to node A via a near link and to node D via a skip link, as shown by the arrows leaving node B in FIG. 3A. Similarly, node C transmits a message to node A via a skip link and to node D via a near link, as shown by the arrows leaving node C in FIG. 3B. The messages transmitted from nodes B and C have a hop count of zero, which indicates that nodes B and C are the source. These data transmissions from nodes B and C take place simultaneously.

The guardian nodes are configured to relay the message received from one of the true pair nodes to the other true pair node. The guardian nodes are generally referred to as the clockwise guardian node and the counterclockwise guardian node, in a manner similar to the nomenclature for the true pair. The two guardian nodes operate similarly, but in different directions. In this example, Node A is configured to relay the message received from node C via the skip link to node B via a near link, as shown in FIG. 3B. Node A is also configured to relay the message received from node B via the near link to node C via a skip link, as shown in FIG. 3A. Similarly, node D is configured to relay the message received from node C via the near link to node B via a skip link, as shown in FIG. 3B. Node D is also configured to relay the message received from node B via the skip link to node C via the near link, as shown in FIG. 3A. It is noted that node A need not increment the hop count for the message relayed to node B or for the message relayed to node C. Similarly, node D need not increment the hop count for the message relayed to node B or for the message relayed to node C as shown in FIGS. 3A-3B. The true pair and the guardian nodes are effectively an "atomic source" where the hop count is not needed internally and the hop count on all links from these nodes to the rest of the ring are such that the all hop counts represent a hop count of zero leaving both nodes in the true pair. The atomic (meaning indivisible) characteristic also means that if any of the four nodes (two true pair and two guardians) don't agree that the two true pair nodes are sending identical data on all their links, all four nodes work at blocking the remainder of the transmission, described in the following paragraphs.

Messages that are transmitted outside these four nodes would have their hop counts incremented. In this regard, the counterclockwise guardian node, node A in this example, is configured to relay the message received from node B via a near link to node F via a near link, as shown in FIG. 3C. Node A would increment by 1 the hop count it received from node B and node F would increment by 1 the hop count it received from node A. Thus, in this scenario, node F would see a cumulative hop count of 2 in channel 110. Node A is also configured to relay the message received from node B via a near link to node E via a skip link, as shown in FIG. 3C. Node A would increment by 1 the hop count it got from node B and node E would increment by 2 the hop count it got from node A. Thus, in this scenario, node E would see a cumulative hop count of 3 in channel 110.

Similarly, the clockwise guardian node, node D in this example is configured to relay the message received from node C via a near link to node E via a near link, as shown in FIG. 3D. Node D would increment by 1 the hop count it received from node C and node E would increment by 1 the hop count it received from node D. Thus, in this scenario, node E would see a cumulative hop count of 2 in channel 112. Node D is also configured to relay the message received from node C via a near link to node F via a skip link, as shown in FIG. 3D. Node D would increment by 1 the hop count it got from node C and node F would increment by 2 the hop count it got from node D. Thus, in this scenario, node F would see a cumulative hop count of 3 in channel 112.

In this scenario, node E would see a hop count of 3 in channel 110 and a hop count of 2 in channel 112; and, node F would see a hop count of 2 in channel 110 and a hop count of 3 in channel 112. By combining the hop counts for channels 110 and 112, nodes E and F each would see a sum of 5, which is the correct N−1 for this 6-node scenario. In some examples, the guardian nodes are also configured to determine whether the hop count is greater than or equal to a threshold and terminate transmission if this condition is met. In some examples, the threshold is 128, which is the threshold to avoid a rollover or overflow scenario for a 7-bit hop count field.

Each node of the true pair compares the message that it initially sent to the guardian nodes to the message it receives from the guardian nodes. If the message received from the guardian nodes does not match the message the true pair node sent, then all transmission for the communication system is terminated for that timeslot. For example, if the message that node B receives from node C via node A or the message that node B receives from node C via node D does not match the initial message sent by node B, then node B will terminate transmission for that timeslot. Similarly, if the message that node C receives from node B via node A or the message that node C receives from node B via node D does not match the initial message sent by node C, then node C will terminate transmission for that timeslot.

For store-and-forward rings, an entire message must be received before it can be compared, so it is not possible to truncate the message to indicate a fault. Instead, for the store-and-forward rings, the "tail" would be a separate "self-affirmation" message. In some examples, the "self-affirmation" message is an additional message transmitted after the body message, which serves to indicate when a fault is present for the communication network. Like the truncation discussed above, a receiver is able to determine when an overall message is incomplete when the self-affirmation message is not received and thus terminate transmission upon making such a determination. In other words, a complete message in the store-and-forward message propagation includes both the body message and the self-affirmation message. If no faults are present, the body message and the self-affirmation message will be received by all nodes in the communication network 100.

FIGS. 5A-5B are diagrams depicting exemplary propagation of messages by a relay node of a communication system. The relay nodes prefer to receive inputs via a skip link, and relay the message via a near link and a skip link. The operation of the relay node will now be discussed with respect to the store-and-forward message propagation technique.

In the example shown in FIG. 5A, relay node E operation is depicted. In this example, Node E is configured to relay the message received from node C via the skip link to node F via a near link. Node E is also configured to relay the message received from node C via the skip link to node A via a skip link. In the other direction, node E is configured to relay the message received from node A via a skip link to node D via a near link. Node E is also configured to relay the message received from node A via the skip link to node C via a skip link. In each of the scenarios, node E is configured to increment the hop count by 2 since the messages being relayed are received over a skip link.

In the example shown in FIG. 5B, relay node F operation is depicted, which is similar to the operation of node E. In this example, Node F is configured to relay the message received from node D via the skip link to node A via a near link. Node F is also configured to relay the message received from node D via the skip link to node B via a skip link. In the other direction, node F is configured to relay the message received from node B via a skip link to node E via a near link. Node F is also configured to relay the message received from node B via the skip link to node D via a skip link. In each of the scenarios, node F is configured to increment the hop count by 2 since the messages being relayed are received over a skip link.

When implementing the true pair and guardian nodes as discussed above with respect to the store-and-forward message propagation technique, the nodes in the communication network also use a consistent set of criteria for accepting a message received by the node. First, it is required that a complete message must be received (for example, body message and self-affirmation message as discussed above) in order for it to be accepted. If the protocol includes a tail, the tail must be complete. In some examples, the time stamps of the messages are compared and the accumulated delay is processed, which aids in ensuring that the messages are bounded with respect to a single transmission time window. If a respective node receives a complete message (and if the time stamps and accumulated delay are acceptable), the respective node of the communication network accepts the complete message if any six of the following conditions are true:

First Condition: (1) If a message is received via the counterclockwise near port 103-1 and the counterclockwise skip port 103-2; and (2) the messages are identical.

Second Condition: (1) If a message is received via the clockwise near port 103-3 and the clockwise skip port 103-4; and (2) the messages are identical.

Third Condition: (1) If a message is received via the counterclockwise near port 103-1 and the clockwise near port 103-3; (2) the messages are identical except for hop count; and (3) the sum of the hop counts equals the total number of nodes in the braided ring minus one.

Fourth Condition: (1) If a message is received via the counterclockwise near port 103-1 and the clockwise skip port 103-4; (2) the messages are identical except for hop count; and (3) the sum of the hop counts equals the total number of nodes in the braided ring minus one.

Fifth Condition: (1) If a message is received via the counterclockwise skip port 103-2 and the clockwise near port 103-3; (2) the messages are identical except for hop count; and (3) the sum of the hop counts equals the total number of nodes in the braided ring minus one.

Sixth Condition: (1) If a message is received via the counterclockwise skip port 103-2 and the clockwise skip port 103-4; (2) the messages are identical except for hop count; and (3) the sum of the hop counts equals the total number of nodes in the braided ring minus one.

The configurations described above guarantees that all good nodes (for example, non-faulty nodes) will receive the same message when there are any two non-colluding failures. Additional details regarding comparisons and actions of self-checking pairs in which both nodes source the data are described in the '859 patent.

Virtual Pair Scenario

In some examples, two of the nodes 102 are configured to form a virtual self-checking pair 114 with each other (also referred to herein as a "virtual pair"). In the example shown in FIG. 1, node B forms a virtual self-checking pair 114 with node C. Nodes C and B then act as a virtual self-checking pair to output the data to the other nodes of the network 100. As used herein with respect to FIGS. 6A-6D, the term "data" means "data stream" in the context of cut-through flooding message propagation and "message" in the context store-and-forward message propagation. The virtual pair, like the true pair and the communication network 100 generally, can operate using the cut-through flooding message propagation or the store-and-forward propagation technique.

Operation of the nodes of a virtual pair and the guardian nodes is discussed below with respect to FIGS. 6A-6D. Operation of a relay node in the communication network is the same for true pair and virtual pair scenarios. It should be understood that the designation of the particular nodes for the virtual pair, the guardian nodes, and the relay nodes is for ease of description and that in practice the nodes will likely have different roles for different timeslots depending on the circumstances.

Figure 6A:
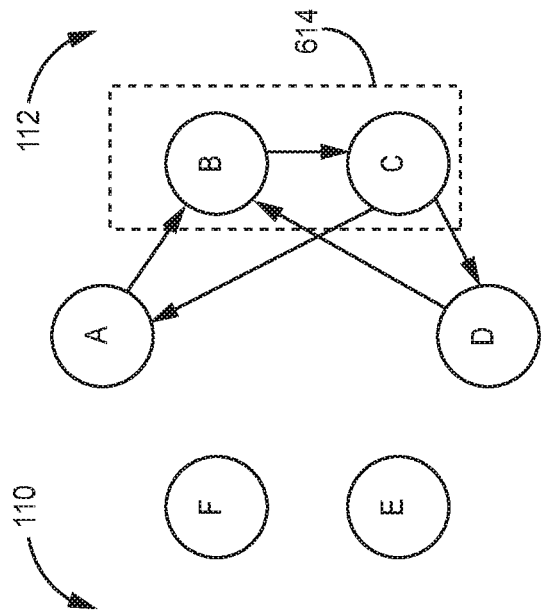
FIG. 6A-6D are diagrams depicting exemplary propagation of messages in an example of a network.
Figure 6B:
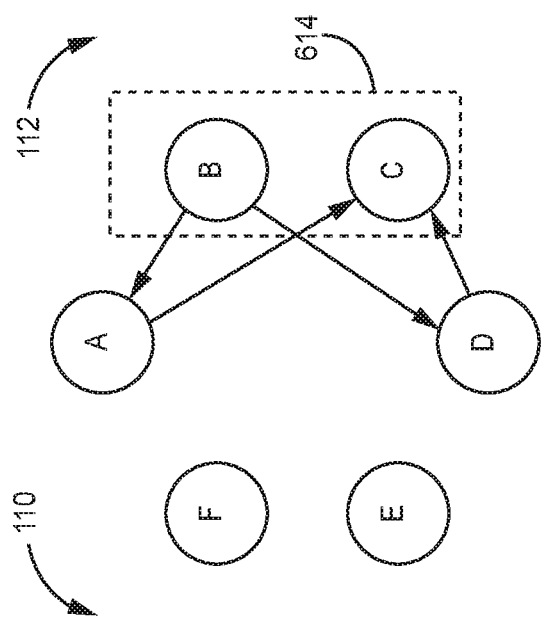
Figure 6D:
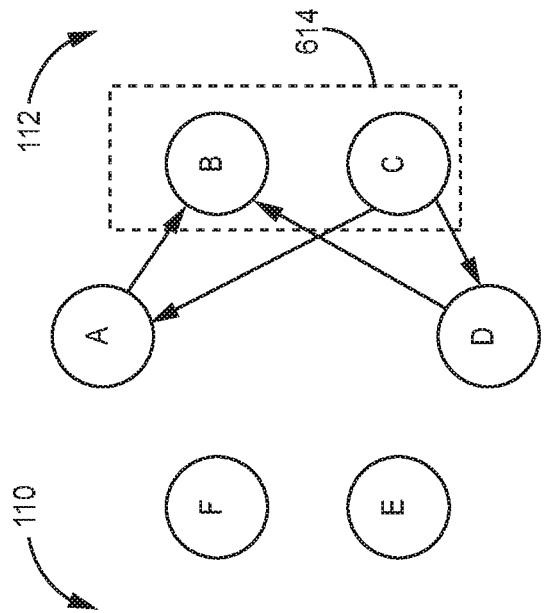
Figure 6C:
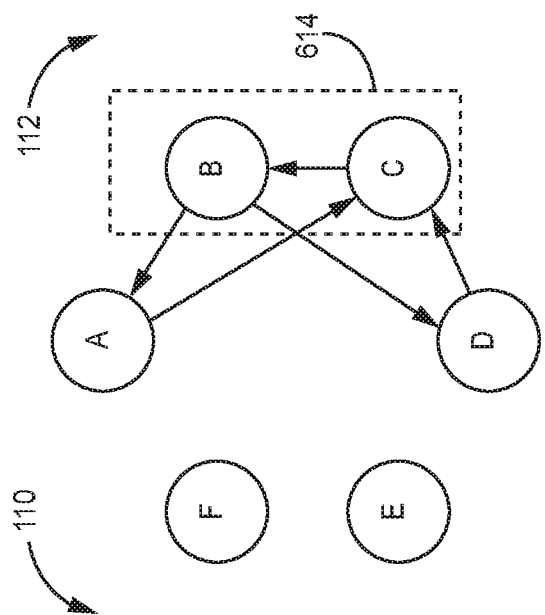

At least one of the nodes 102 is configured to form a virtual self-checking pair with one of its neighbor nodes (referred to herein as the 'virtual pair node') when transmitting data on both channels. In the example shown in FIG. 1, node C forms a virtual self-checking pair 114 with node B. Nodes C and B then act as a self-checking pair to output the data to the other nodes of the network 100. However, in contrast to the examples described above for the true pair, only one of the nodes in the virtual self-checking pair sources the data to be compared. For example, rather than sourcing the data to be compared from both node B and node C, as discussed above with respect to FIGS. 3A-3B, only node B sources the data (as shown in FIGS. 6A-6B) or only node C sources the data (as shown in FIGS. 6C-6D) as described below. Thus, unlike true self-checking pairs, virtual self-checking pairs in the examples described herein have a simplex source.

FIGS. 6A-6D are diagrams depicting exemplary propagation of a message in an example of a communication system. The members of the virtual pair are configured to operate differently and are referred to generally as the source (the simplex source of data) and the attester (the node in a virtual pair that initially does not have the data that is to be transmitted). Similar to the description above, a clockwise source or attester is positioned clockwise from the other member of the virtual pair and the counterclockwise source or attester is positioned counterclockwise from the other member of the virtual pair.

In the example shown in FIGS. 6A-6B, node B is the counterclockwise source and node C is the clockwise attester. In the example shown in FIGS. 6C-6D, node B is the counterclockwise attester and node C is the clockwise source. For ease of description, the operation of the communication network will be described when nodes B and C are the members of the virtual pair. However, it should be understood that the concepts described herein are generally applicable to other combinations for a virtual pair.

In the example shown in FIGS. 6A-6B, when the source, node B, has data to send that requires the data to agree on both channels 110, 112, node B forms a virtual self-checking pair 614 with one of its neighbors (node C in this example). In one example, node B forms the virtual self-checking pair 614 with node B by sharing the data it wants to send with node C ahead of the transmission to the rest of the nodes 102 in the network 100. For example, if a schedule, such as a Time Division Multiple Access (TDMA) schedule, indicates that node B is to transmit data in timeslot T, node B passes the data to be transmitted to node C during timeslot T−1. In other examples, in particular cut-through examples, node B begins passing the data to be transmitted to node C during timeslot T and proceeds to transfer the data while node C and the guardians perform their functions on this data in a pipeline fashion.

At the beginning of timeslot T, where the nodes B and C are configured to operate as a virtual pair, both node B and node C will kill or otherwise terminate any message currently being relayed or guarded by node B or node C. This operation enables the virtual pair to prevent a babbling node from interfering with the transmission of data from the virtual pair to the guardian nodes.

The source of the virtual pair proceeds with waiting a particular delay time, which is an implementation dependent delay from the start of the timeslot to the start of the transmission time. Waiting for the particular delay time ensures that the termination of current messages has completed. In some examples, there is also a delay in the timeslot from the beginning of the timeslot to the start of transmission time to allow for clock skew between the transmitter and the receivers.

When the delay time expires, each node of the virtual pair proceeds with transmitting data to the other node of the virtual pair via the guardian nodes. In particular, each node of the virtual pair transmits an identical message to each of the guardians, and the guardians then relay the messages to the other member of the virtual pair. Each member of the virtual pair then compares the messages it initially sent to the messages received from the other member via the guardian nodes. If the messages do not match, then all transmission for the communication network is terminated for that timeslot.

The operation of the guardians and the relay nodes for the virtual pair scenario is the same as that discussed above with respect to the true pair scenario. For example, each node of the virtual pair (source and attester) proceeds with comparing the data that it initially sent to the guardian nodes to the data it received from the guardian nodes. If the data received from the guardian nodes does not match the data the virtual pair node sent, then all transmission for the communication system is terminated for that timeslot. For example, if the data node B receives from node C via node A or the data node B receives from node C via node D does not match the initial data sent by node B, then node B will terminate transmission for that timeslot in a manner similar to that discussed above. Similarly, if the data node C receives from node B via node A or the data node C receives from node B via node D does not match the initial data sent by node C, then node C will terminate transmission for that timeslot in a manner similar to that discussed above.

The configuration described above guarantees that all good nodes (for example, non-faulty nodes) will receive the same message when there are any two non-colluding failures. Additional details regarding comparisons and actions of virtual self-checking pairs in which only one node sources the data are described in the '675 patent.

Two Transmitter Example

Figure 7:
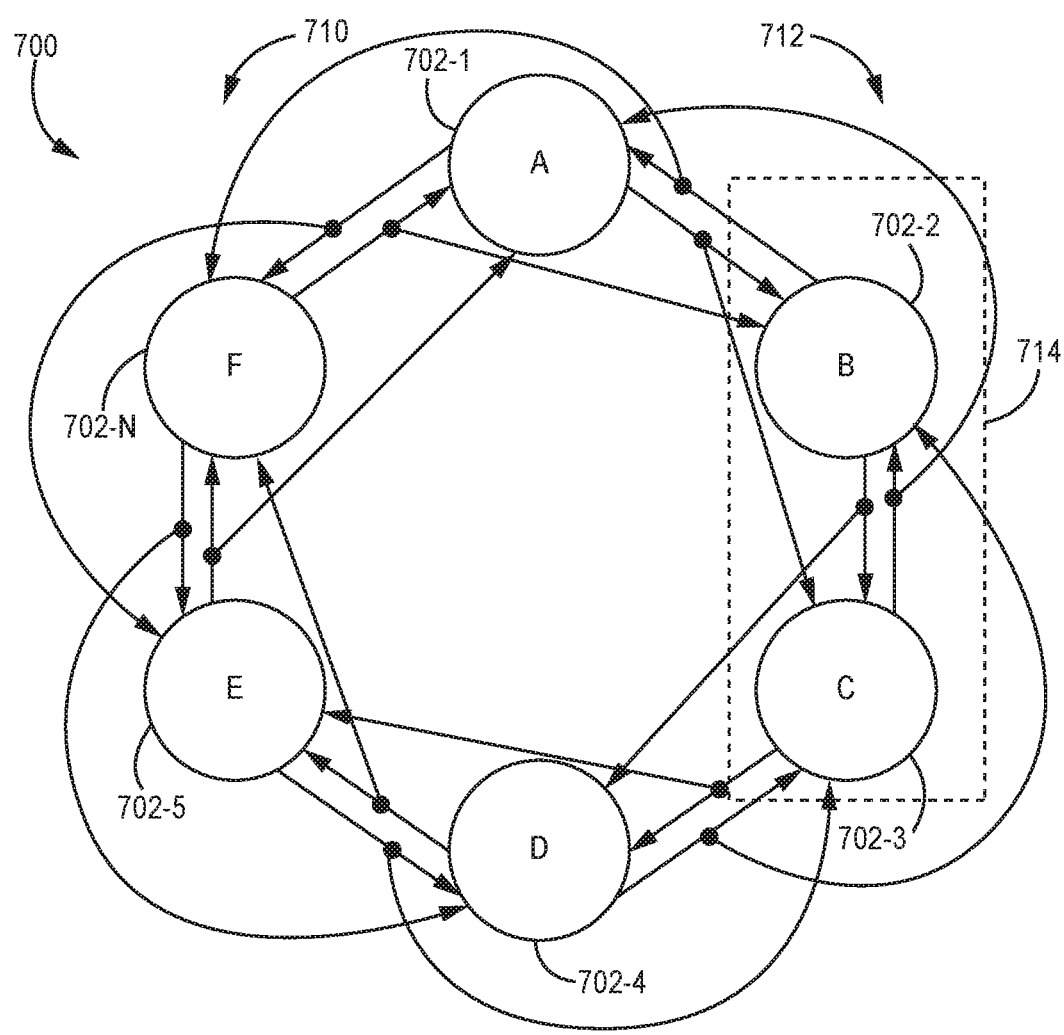
FIG. 7 is a diagram of an alternative example of a network.

FIG. 7 is a diagram of an example of an alternative communication network 700. Similar features of the communication network 700 compared to the communication network 100 described above are numbered similarly. Further, operation of the nodes 702 is similar, except that each node 702 in FIG. 7 has two transmitters (one clockwise and one counterclockwise) and each node 102 in FIG. 1 has 4 transmitters, 2 in each direction. The techniques for dual fault-tolerance discussed above with respect to the communication network 100 could also apply to the communication network 700 and cut the number of transmitters by half. However, in the communication network 700, the guardian nodes, nodes A and D in this example, would truncate any signal that miscompares or not send the self-affirmation portion of the message that miscompares.

In various aspects, system elements, method steps, or examples described throughout this disclosure (such as the nodes 102, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a method comprising: sending a communication from a first member node of a pair of nodes to a second member of the pair of nodes via two nodes immediately adjacent to the pair of nodes in a braided ring network, wherein the communication is sent using both of the shortest paths from the first member node through the two nodes and back to the second member node; sending the communication from the second member node of the pair of nodes to the first member node of the pair of nodes via the two nodes immediately adjacent to the pair of nodes in the braided ring network, wherein the communication is sent using both of the shortest paths from the second member node through the two nodes and back to the first member node; stopping, with the first member node, the transmission of the communication prior to completion of the communication if both copies of the communication that the first member node receives from the second member node are not identical to the communication that the first member node sent; and stopping, with the second member node, the transmission of the communication prior to completion of the communication if both copies of the communication that the second member node receives from the first member node are not identical to the communication that the second member node sent.

Example 2 includes the method of Example 1, wherein the communication is a message propagated between nodes through store-and-forward propagation.

Example 3 includes the method of Example 2, wherein each message comprises two transmitted parts, wherein the two transmitted parts include a bulk of the message and a self-affirmation, wherein stopping the transmission comprises not sending the self-affirmation.

Example 4 includes the method of Example 1, wherein the communication is a data stream propagated between nodes via a cut-through flooding propagation.

Example 5 includes the method of Example 4, wherein stopping the transmission comprises truncating an end portion of each data stream to indicate an incomplete transmission.

Example 6 includes the method of Example 5, wherein the end portion of each data stream comprises an error detection field of a protocol.

Example 7 includes the method of any of Examples 5-6, wherein the end portion of each data stream comprises a bit or a byte added to the end of a protocol stream.

Example 8 includes the method of any of Examples 1-7, wherein sending a communication from the first member node of the pair of nodes to the second member of the pair of nodes via two nodes immediately adjacent to the pair of nodes in a braided ring network comprises: transmitting a first communication from the first member node to a first guardian node adjacent to the first member node and to a second guardian node adjacent to the second member node; and relaying copies of the first communication, from the first guardian node adjacent to the first member node and from the second guardian node adjacent to the second member node, to the second node; wherein sending the communication from the second member node of the pair of nodes to the first member node of the pair of nodes via the two nodes immediately adjacent to the pair of nodes in the braided ring network comprises: transmitting a second communication from the second member node to the first guardian node adjacent to the first member node and to the second guardian node adjacent to the second member node; and relaying copies of the second communication, from the first guardian node adjacent to the first member node and from the second guardian node adjacent to the second member node, to the first member node.

Example 9 includes the method of any of Examples 1-8, wherein the pair of nodes comprises either: a real self-checking pair where both the first member node and the second member node are source nodes; or a virtual self-checking pair where only the first member node is a source node.

Example 10 includes a network comprising: a plurality of nodes; and a plurality of links communicatively coupling each of the plurality of nodes to at least one respective adjacent node of the plurality of nodes via a first communication channel and to another respective adjacent node of the plurality of nodes via a second communication channel, wherein the plurality of nodes and the plurality of links have a braided ring topology; wherein a first node and a second node of the plurality of nodes are configured to source data, wherein the first node and the second node are adjacent nodes, wherein at least one of the first node and the second node is a source node; wherein the first node is configured to send a first communication to the second node via a third node of the plurality of nodes that is adjacent the first node and via a fourth node of the plurality of nodes that is adjacent the second node; wherein the second node is configured to send a second communication to the first node via the third node and via the fourth node; wherein at least one of the first node and the second node is configured to terminate transmission of the first communication and the second communication when the first communication does not match the second communication.

Example 11 includes the network of Example 10, wherein the plurality of nodes is configured to send messages using store-and-forward propagation, wherein the first communication is a first message and the second communication is a second message.

Example 12 includes the network of Example 11, wherein the first message and the second message each comprise two transmitted parts, wherein the two transmitted parts include a bulk of the message and a self-affirmation, wherein the first node and the second node are configured to not send the self-affirmation to indicate an incomplete transmission.

Example 13 includes the network of Example 10, wherein the plurality of nodes is configured to send data streams using cut-through flooding propagation, wherein the first communication is a first data stream and the second communication is a second data stream.

Example 14 includes the network of Example 13, wherein the first node and the second node are configured to truncate an end portion of each data stream to indicate an incomplete transmission.

Example 15 includes the network of Example 14, wherein the end portion of each data stream comprises an error detection field of a protocol.

Example 16 includes the network of any of Examples 14-15, wherein the end portion of each data stream comprises a bit or a byte added to the end of a protocol stream.

Example 17 includes the network of any of Examples 10-16, wherein the plurality of links comprises: a first plurality of links communicatively coupling each of the plurality of nodes to a respective adjacent node on the first channel and a respective adjacent node on the second channel; and a second plurality of links communicatively coupling each of the plurality of nodes to a respective skip node on the first channel and a respective skip node on the second channel.

Example 18 includes the network of any of Examples 10-17, wherein the first node and the second node of the plurality of nodes form either: a real self-checking pair where both the first node and the second node are source nodes; or a virtual self-checking pair where only the first node is a source node.

Example 19 includes the network of any of Examples 10-18, wherein the first node is configured to compare the second communication, received from the third node and the fourth node, to the first communication sent by the first node, wherein the first node is configured to terminate transmission of the first communication and the second communication when the second communication, received from the third node and the fourth node, does not match the first communication sent by the first node; and wherein the second node is configured to compare the first communication, received from the third node and the fourth node, to the second communication sent by the second node, wherein the second node is configured to terminate transmission of the first communication and the second communication when the first communication, received from the third node and the fourth node, does not match the second communication sent by the second node.

Example 20 includes a braided ring network comprising: a plurality of nodes; and a first plurality of links communicatively coupling each of the plurality of nodes to a respective adjacent node on the first channel and a respective adjacent node on the second channel; and a second plurality of links communicatively coupling each of the plurality of nodes to a respective skip node on the first channel and a respective skip node on the second channel; wherein a first node and a second node of the plurality of nodes are configured to source data, wherein the first node and the second node are adjacent nodes, wherein at least one of the first node and the second node is a source node; wherein the first node is configured to send a first communication to the second node via a third node of the plurality of nodes that is adjacent the first node and via a fourth node of the plurality of nodes that is adjacent the second node; wherein the second node is configured to send a second communication to the first node via the third node and via the fourth node; wherein the first node is configured to compare the second communication, received from the third node and the fourth node, to the first communication sent by the first node, wherein the first node is configured to terminate transmission of the first communication and the second communication when the second communication, received from the third node and the fourth node, does not match the first communication sent by the first node; and wherein the second node is configured to compare the first communication, received from the third node and the fourth node, to the second communication sent by the second node, wherein the second node is configured to terminate transmission of the first communication and the second communication when the first communication, received from the third node and the fourth node, does not match the second communication sent by the second node.

Example 21 includes a method comprising: sending a message from a first member of a real or virtual pair to a second member of the real or virtual pair via two nodes immediately adjacent to the real or virtual pair in a braided ring network, wherein the message is sent using both of the shortest paths from the first pair member through the two nodes and back to the second pair member; sending the message from the second member of a real or virtual pair to the first member of the real or virtual pair via the two nodes immediately adjacent to the real or virtual pair in the braided ring network, wherein the message is sent using both of the shortest paths from the second pair member through the two nodes and back to the first pair member; stopping, with the first pair member, the transmission of the message prior to completion of the message if both copies of the message the first pair member receives from the second pair member are not identical to the message the first pair member sent; and stopping, with the second pair member, the transmission of the message prior to completion of the message if both copies of the message the second pair member receives from the first pair member are not identical to the message the second pair member sent.

Example 22 includes the method of Example 21, wherein the messages are propagated through store-and-forward propagation.

Example 23 includes the method of Example 22, wherein each message comprises two transmitted parts, wherein the transmitted parts include a bulk of the message and a self-affirmation, wherein stopping the transmission comprises not sending the self-affirmation.

Example 24 includes a network comprising: a plurality of nodes; and a plurality of links communicatively coupling each of the plurality of nodes to at least one respective adjacent node of the plurality of nodes via a first communication channel and to another respective adjacent node of the plurality of nodes via a second communication channel; wherein a first node and a second node of the plurality of nodes are configured to source data, wherein the first node and the second node are adjacent nodes, wherein at least one of the first node and the second node are a source node; wherein the first node is configured to communicate a first message to the second node via a third node of the plurality of nodes that is adjacent the first node and via a fourth node of the plurality of nodes that is adjacent the second node; wherein the second node is configured to communicate a second message to the first node via the third node and via the fourth node; wherein the first node is configured to compare the second message received from the third node and the fourth node to the first message, wherein the first node is configured to terminate transmission when the first message does not match the second message; wherein the second node is configured to compare the first message received from the third node and the fourth node to the second message, wherein the second node is configured to terminate transmission when the first message does not match the second message.

Example 25 includes the network of Example 24, wherein the plurality of nodes is configured to communicate messages using store-and-forward propagation.

Example 26 includes the network of Example 25, wherein each message comprises two transmitted parts, wherein the transmitted parts include a bulk of the message and a self-affirmation.

Example 27 includes the network of any of Examples 24-26, wherein the plurality of links comprises: a first plurality of links communicatively coupling each of the plurality of nodes to a respective adjacent node on the first channel and a respective adjacent node on the second channel; and a second plurality of links communicatively coupling each of the plurality of nodes to a respective skip node on the first channel and a respective skip node on the second channel.

Example 28 includes a method of communicating data in a braided ring network, the method comprising: determining when a first node is to transmit data to one or more nodes in a network as part of a self-checking pair; forming the self-checking pair with the first node and a second node adjacent to the first node, wherein at least one of the first node and the second node sources the data to be output from the self-checking pair; transmitting a first message from the first node to a third node adjacent to the first node and to a fourth node adjacent to the second node; transmitting a second message from the second node to the third node adjacent to the first node and to the fourth node adjacent to the second node; relaying a copy of the first message, from the third node adjacent to the first node and from the fourth node adjacent to the second node, to the second node; relaying a copy of the second message, from the third node adjacent to the first node and from the fourth node adjacent to the second node, to the first node; comparing the copies of the first message with the second message; comparing the copies of the second message with the first message; stopping transmission of the first message and the second message prior to completion if both copies of the first message are not identical to the second message or if both copies of the second message are not identical to the first message.

Example 29 includes the method of Example 28, wherein the messages are propagated through store-and-forward propagation.

Example 30 includes the method of Example 29, wherein each message comprises two transmitted parts, wherein the transmitted parts include a bulk of the message and a self-affirmation, wherein stopping the transmission comprises not sending the self-affirmation.

Example 31 includes a method comprising: sending a message from a first member of a real or virtual pair to a second member of the real or virtual pair via a first guardian node immediately adjacent to the real or virtual pair in a braided ring network, wherein the message is sent using the shortest path from the first pair member through the first guardian node and back to the second pair member; sending a message from a first member of a real or virtual pair to a second member of the real or virtual pair via a second guardian node immediately adjacent to the real or virtual pair in the braided ring network, wherein the message is sent using the shortest path from the first pair member through the second guardian node and back to the second pair member; sending the message from the second member of a real or virtual pair to the first member of the real or virtual pair via the first guardian node, wherein the message is sent using the shortest path from the second pair member through the first guardian node and back to the first pair member; sending the message from the second member of a real or virtual pair to the first member of the real or virtual pair via the second guardian node, wherein the message is sent using the shortest path from the second pair member through the second guardian node and back to the first pair member; stopping the transmission of the message prior to completion of the message with either the first guardian node or the second guardian node.

Example 32 includes a method comprising: sending a data stream from a first member of a real or virtual pair to a second member of the real or virtual pair via two nodes immediately adjacent to the real or virtual pair in a braided ring network, wherein the data stream is sent using both of the shortest paths from the first pair member through the two nodes and back to the second pair member; sending the data stream from the second member of a real or virtual pair to the first member of the real or virtual pair via the two nodes immediately adjacent to the real or virtual pair in the braided ring network, wherein the data stream is sent using both of the shortest paths from the second pair member through the two nodes and back to the first pair member; stopping, with the first pair member, the transmission of the data stream prior to completion of the data stream if both copies of the data stream the first pair member receives from the second pair member are not identical to the data stream the first pair member sent; and stopping, with the second pair member, the transmission of the data stream prior to completion of the data stream if both copies of the data stream the second pair member receives from the first pair member are not identical to the data stream the second pair member sent.

Example 33 includes the method of Example 32, wherein the data stream is propagated between nodes via a cut-through flooding propagation.

Example 34 includes the method of Example 33, wherein stopping the transmission comprises truncating an end portion of each data stream to indicate an incomplete transmission.

Example 35 includes the method of Example 34, wherein the end portion of each data stream comprises an error detection field of a protocol.

Example 36 includes the method of any of Examples 34-35, wherein the end portion of each data stream comprises a bit or a byte added to the end of a protocol stream.

Example 37 includes a network comprising: a plurality of nodes; and a plurality of links communicatively coupling each of the plurality of nodes to at least one respective adjacent node of the plurality of nodes via a first communication channel and to another respective adjacent node of the plurality of nodes via a second communication channel; wherein a first node and a second node of the plurality of nodes are configured to source data, wherein the first node and the second node are adjacent nodes, wherein at least one of the first node and the second node are a source node; wherein the first node is configured to communicate a first data stream to the second node via a third node of the plurality of nodes that is adjacent the first node and via a fourth node of the plurality of nodes that is adjacent the second node; wherein the second node is configured to communicate a second data stream to the first node via the third node and via the fourth node; wherein the first node is configured to compare the second data stream received from the third node and the fourth node to the first data stream, wherein the first node is configured to terminate transmission when the first data stream does not match the second data stream; wherein the second node is configured to compare the first data stream received from the third node and the fourth node to the second data stream, wherein the second node is configured to terminate transmission when the first data stream does not match the second data stream.

Example 38 includes the network of Example 37, wherein the plurality of nodes is configured to communicate data streams using cut-through flooding propagation.

Example 39 includes the network of Example 38, wherein the first node and the second node are configured to truncate an end portion of each data stream is truncated to indicate an incomplete transmission.

Example 40 includes the network of Example 39, wherein the end portion of each data stream comprises an error detection field of a protocol.

Example 41 includes the network of any of Examples 39-40, wherein the end portion of each data stream comprises a bit or a byte added to the end of a protocol stream.

Example 42 includes the network of any of Examples 37-41, wherein the plurality of links comprises: a first plurality of links communicatively coupling each of the plurality of nodes to a respective adjacent node on the first channel and a respective adjacent node on the second channel; and a second plurality of links communicatively coupling each of the plurality of nodes to a respective skip node on the first channel and a respective skip node on the second channel.

Example 43 includes a method of communicating data in a braided ring network, the method comprising: determining when a first node is to transmit data to one or more nodes in a network as part of a self-checking pair; forming the self-checking pair with the first node and a second node adjacent to the first node, wherein at least one of the first node and the second node sources the data to be output from the self-checking pair; transmitting a first data stream from the first node to a third node adjacent to the first node and to a fourth node adjacent to the second node; transmitting a second data stream from the second node to the third node adjacent to the first node and to the fourth node adjacent to the second node; relaying the first data stream, from the third node adjacent to the first node and from the fourth node adjacent to the second node, to the second node; relaying the second data stream, from the third node adjacent to the first node and from the fourth node adjacent to the second node, to the first node; comparing the first data stream with the second data stream; comparing the second data stream with the first data stream; stopping transmission of the first data stream and the second data stream prior to the completion if the first data stream is not identical to the second data stream.

Example 44 includes the method of Example 43, wherein the first data stream and the second data stream are propagated between nodes via a cut-through flooding propagation.

Example 45 includes the method of Example 44, wherein stopping the transmission comprises truncating an end portion of each of the first data stream and the second data stream to indicate an incomplete transmission.

Example 46 includes the method of Example 45, wherein the end portion of each of the first data stream and the second data stream comprises an error detection field of a protocol.

Example 47 includes the method of any of Examples 45-46, wherein the end portion of each of the first data stream and the second data stream comprises a bit or a byte added to the end of a protocol stream.

Example 48 includes a method comprising: sending a message from a first member of a real or virtual pair to a second member of the real or virtual pair via a first guardian node immediately adjacent to the real or virtual pair in a braided ring network, wherein the message is sent using the shortest path from the first pair member through the first guardian node and back to the second pair member; sending a message from a first member of a real or virtual pair to a second member of the real or virtual pair via a second guardian node immediately adjacent to the real or virtual pair in the braided ring network, wherein the message is sent using the shortest path from the first pair member through the second guardian node and back to the second pair member; sending the message from the second member of a real or virtual pair to the first member of the real or virtual pair via the first guardian node, wherein the message is sent using the shortest path from the second pair member through the first guardian node and back to the first pair member; sending the message from the second member of a real or virtual pair to the first member of the real or virtual pair via the second guardian node, wherein the message is sent using the shortest path from the second pair member through the second guardian node and back to the first pair member; stopping the transmission of the message prior to completion of the message with either the first guardian node or the second guardian node.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
transmitting a first communication from the first member node to a first guardian node adjacent to the first member node in a braided ring network and to a second guardian node adjacent to the second member node in the braided ring network;
relaying copies of the first communication from the first guardian node and from the second guardian node to the second member node;
transmitting a second communication from the second member node to the first guardian node and to the second guardian node;
relaying copies of the second communication, from the first guardian node and from the second guardian node to the first member node;
stopping, with the first member node, the transmission of the first communication prior to completion of the first communication if both copies of the second communication that the first member node receives from the second member node are not identical to the first communication that the first member node sent; and
stopping, with the second member node, the transmission of the second communication prior to completion of the second communication if both copies of the first communication that the second member node receives from the first member node are not identical to the second communication that the second member node sent.

2. The method of claim 1, wherein the first communication and the second communication are messages propagated between nodes through store-and-forward propagation.

3. The method of claim 2, wherein each message comprises two transmitted parts, wherein the two transmitted parts include a bulk of the message and a self-affirmation, wherein stopping the transmission comprises not sending the self-affirmation.

4. The method of claim 1, wherein the first communication and the second communication are data streams propagated between nodes via a cut-through flooding propagation.

5. The method of claim 4, wherein stopping the transmission of the first communication and stopping the transmission of the second communication comprises truncating an end portion of each data stream to indicate an incomplete transmission.

6. The method of claim 5, wherein the end portion of each data stream comprises an error detection field of a protocol.

7. The method of claim 5, wherein the end portion of each data stream comprises a bit or a byte added to the end of a protocol stream.

8. The method of claim 1, wherein the pair of nodes comprises either:
a real self-checking pair where both the first member node and the second member node are source nodes; or
a virtual self-checking pair where only the first member node is a source node.

9. A network comprising:
a plurality of nodes; and
a plurality of links communicatively coupling each of the plurality of nodes to at least one respective adjacent node of the plurality of nodes via a first communication channel and to another respective adjacent node of the plurality of nodes via a second communication channel, wherein the plurality of nodes and the plurality of links have a braided ring topology;
wherein a first node and a second node of the plurality of nodes are configured to source data, wherein the first node and the second node are adjacent nodes, wherein at least one of the first node and the second node is a source node;
wherein the first node is configured to transmit a first communication to a third node of the plurality of nodes that is adjacent the first node and to a fourth node of the plurality of nodes that is adjacent the second node;
wherein the third node and the fourth node are configured to relay copies of the first communication from the first node to the second node;
wherein the second node is configured to transmit a second communication to the third node and to the fourth node;
wherein the third node and the fourth node are configured to relay copies of the second communication from the second node to the first node;
wherein at least one of the first node and the second node is configured to terminate transmission of the first communication and the second communication when the first communication does not match the second communication.

10. The network of claim 9, wherein the plurality of nodes is configured to send messages using store-and-forward propagation, wherein the first communication is a first message and the second communication is a second message.

11. The network of claim 10, wherein the first message and the second message each comprise two transmitted parts, wherein the two transmitted parts include a bulk of the message and a self-affirmation, wherein the first node and the second node are configured to not send the self-affirmation to indicate an incomplete transmission.

12. The network of claim 9, wherein the plurality of nodes is configured to send data streams using cut-through flooding propagation, wherein the first communication is a first data stream and the second communication is a second data stream.

13. The network of claim 12, wherein the first node and the second node are configured to truncate an end portion of each data stream to indicate an incomplete transmission.

14. The network of claim 13, wherein the end portion of each data stream comprises an error detection field of a protocol.

15. The network of claim 13, wherein the end portion of each data stream comprises a bit or a byte added to the end of a protocol stream.

16. The network of claim 9, wherein the plurality of links comprises:
- a first plurality of links communicatively coupling each of the plurality of nodes to a respective adjacent node on the first channel and a respective adjacent node on the second channel; and
- a second plurality of links communicatively coupling each of the plurality of nodes to a respective skip node on the first channel and a respective skip node on the second channel.

17. The network of claim 9, wherein the first node and the second node of the plurality of nodes form either:
- a real self-checking pair where both the first node and the second node are source nodes; or
- a virtual self-checking pair where only the first node is a source node.

18. The network of claim 9, wherein the first node is configured to compare the second communication, received from the third node and the fourth node, to the first communication sent by the first node, wherein the first node is configured to terminate transmission of the first communication and the second communication when the second communication, received from the third node and the fourth node, does not match the first communication sent by the first node; and
- wherein the second node is configured to compare the first communication, received from the third node and the fourth node, to the second communication sent by the second node, wherein the second node is configured to terminate transmission of the first communication and the second communication when the first communication, received from the third node and the fourth node, does not match the second communication sent by the second node.

19. A braided ring network comprising:
- a plurality of nodes; and
- a first plurality of links communicatively coupling each of the plurality of nodes to a respective adjacent node on the first channel and a respective adjacent node on the second channel; and
- a second plurality of links communicatively coupling each of the plurality of nodes to a respective skip node on the first channel and a respective skip node on the second channel;
- wherein a first node and a second node of the plurality of nodes are configured to source data, wherein the first node and the second node are adjacent nodes, wherein at least one of the first node and the second node is a source node;
- wherein the first node is configured to send a first communication to a third node of the plurality of nodes that is adjacent the first node and to a fourth node of the plurality of nodes that is adjacent the second node;
- wherein the third node and the fourth node are configured to relay copies of the first communication from the first node to the second node;
- wherein the second node is configured to send a second communication to the third node and to the fourth node;
- wherein the third node and the fourth node are configured to relay copies of the second communication from the second node to the first node;
- wherein the first node is configured to compare the second communication, received from the third node and the fourth node, to the first communication sent by the first node, wherein the first node is configured to terminate transmission of the first communication and the second communication when the second communication, received from the third node and the fourth node, does not match the first communication sent by the first node; and
- wherein the second node is configured to compare the first communication, received from the third node and the fourth node, to the second communication sent by the second node, wherein the second node is configured to terminate transmission of the first communication and the second communication when the first communication, received from the third node and the fourth node, does not match the second communication sent by the second node.

* * * * *